US012122690B2

(12) United States Patent
Cosentino et al.

(10) Patent No.: US 12,122,690 B2
(45) Date of Patent: Oct. 22, 2024

(54) SYSTEM FOR ELECTRO-CHEMICALLY INHIBITING BIOLOGICAL GROWTH IN AIR TREATMENT UNITS

(71) Applicant: ELECTROSEA, LLC, Wayzata, MN (US)

(72) Inventors: Louis Ciro Cosentino, Palm Beach Gardens, FL (US); Daniel L. Cosentino, Wayzata, MN (US)

(73) Assignee: INOVOTRON, LLC, Plymouth, MN (US)

( * ) Notice: Subject to any disclaimer, the term of this patent is extended or adjusted under 35 U.S.C. 154(b) by 392 days.

(21) Appl. No.: 17/430,243

(22) PCT Filed: Feb. 10, 2020

(86) PCT No.: PCT/US2020/017486
§ 371 (c)(1),
(2) Date: Aug. 11, 2021

(87) PCT Pub. No.: WO2020/167653
PCT Pub. Date: Aug. 20, 2020

(65) Prior Publication Data
US 2022/0162096 A1 May 26, 2022

Related U.S. Application Data

(60) Provisional application No. 62/803,878, filed on Feb. 11, 2019.

(51) Int. Cl.
*C02F 1/00* (2023.01)
*C02F 1/461* (2023.01)
(Continued)

(52) U.S. Cl.
CPC ........ *C02F 1/46109* (2013.01); *F24F 13/222* (2013.01); *C02F 2001/46133* (2013.01);
(Continued)

(58) Field of Classification Search
CPC ............ C02F 1/46109; C02F 2103/023; C02F 2201/4612; C02F 2001/46133;
(Continued)

(56) References Cited

U.S. PATENT DOCUMENTS 4,337,136 A * 6/1982 Dahlgren ................. E04H 4/16
210/242.1
4,861,489 A * 8/1989 Swift ......................... F24F 6/00
210/764
(Continued)

FOREIGN PATENT DOCUMENTS

JP    H11-207352 A    8/1999
JP    2005-098606 A   4/2005
(Continued)

OTHER PUBLICATIONS

International Search Report and Written Opinion of the International Searching Authority for International Patent Application No. PCT/US2020/017486 mailed Jun. 3, 2020, 15 pages.
(Continued)

*Primary Examiner* — Travis Ruby
(74) *Attorney, Agent, or Firm* — Merchant & Gould P.C.

(57) ABSTRACT

Systems and methods for inhibiting growth of fungi and other organisms in air treatment systems such as air conditioners, humidifiers, dehumidifiers, and air washers. A pair of electrodes are brought into contact with liquid collected by a collection subsystem of the air treatment system. One of the electrodes includes a bio-inhibiting conductor. Electrical current is caused to pass between the electrodes, causing the bio-inhibiting conductor to be released into the collected liquid.

39 Claims, 5 Drawing Sheets

(51) Int. Cl.
*F24F 13/22* (2006.01)
*F24F 6/00* (2006.01)

(52) U.S. Cl.
CPC ..... *C02F 2303/04* (2013.01); *F24F 2006/006* (2013.01); *F24F 2006/008* (2013.01); *F24F 2013/228* (2013.01)

(58) Field of Classification Search
CPC ................ C02F 2303/04; F24F 13/222; F24F 2006/006; F24F 2006/008; F24F 2013/227; F24F 2013/228; F24F 2221/22
See application file for complete search history.

(56) References Cited

U.S. PATENT DOCUMENTS

| | | | | |
|---|---|---|---|---|
| 5,609,742 | A * | 3/1997 | Sampson | C02F 1/4672 205/753 |
| 5,897,765 | A * | 4/1999 | Mercier | C02F 1/4602 204/278.5 |
| 5,954,939 | A * | 9/1999 | Kanekuni | C02F 1/46104 204/278 |
| 6,126,820 | A * | 10/2000 | DeSanto | C02F 1/46104 210/243 |
| 6,287,084 | B1 * | 9/2001 | Kirsten | C02F 1/008 417/228 |
| 6,325,916 | B1 * | 12/2001 | Lambert | C02F 1/463 205/756 |
| 6,508,929 | B1 * | 1/2003 | Mercer | C02F 1/46104 205/742 |
| 6,524,475 | B1 * | 2/2003 | Herrington | B01D 61/06 204/194 |
| 8,795,590 | B1 | 8/2014 | Ellis | |
| 10,933,452 | B1 | 3/2021 | Scaringe et al. | |
| 2010/0116689 | A1 | 5/2010 | Green et al. | |
| 2014/0130888 | A1 * | 5/2014 | Kaiser | B08B 9/032 137/246.22 |
| 2014/0205501 | A1 | 7/2014 | Ellis | |
| 2015/0284276 | A1 * | 10/2015 | Ongeche | C02F 1/4602 210/663 |
| 2018/0031275 | A1 * | 2/2018 | Wilson | F24F 11/63 |
| 2018/0119987 | A1 * | 5/2018 | Rimmer | F24F 6/00 |
| 2018/0259200 | A1 * | 9/2018 | Andersson | F24D 19/08 |
| 2019/0056142 | A1 * | 2/2019 | Jeansonne | C02F 1/688 |

FOREIGN PATENT DOCUMENTS

| | | |
|---|---|---|
| JP | 2009-101320 A | 5/2009 |
| KR | 10-2014-0123871 A | 10/2014 |
| WO | 87/02027 A1 | 4/1987 |
| WO | 87/07251 A1 | 12/1987 |

OTHER PUBLICATIONS

Condensate Pan Microbial Reduction Unit, RGF Environmental Group, Inc., 2 pages, admitted as prior art as of Feb. 10, 2019.
Installation Instructions for Pan Saver, RGF Environmental Group, Inc., 1 page, admitted as prior art as of Feb. 10, 2019.

* cited by examiner

SYSTEM FOR ELECTRO-CHEMICALLY INHIBITING BIOLOGICAL GROWTH IN AIR TREATMENT UNITS

This application is a National Stage Application of PCT/US2020/017486, filed Feb. 10, 2020, which claims priority to U.S. Provisional Patent Application No. 62/803,878, filed Feb. 11, 2019, the disclosures of which are hereby incorporated by reference herein in their entireties. To the extent appropriate, a claim of priority is made to each of the above disclosed applications.

BACKGROUND

Air treatment units typically include liquid collection systems. In the case of air conditioners and dehumidifiers, moisture from the surrounding environment condenses as a byproduct of the air treatment, and the liquid collection system includes a tray or a pan that collects the condensate and drains it away from the air treatment unit. In the case of a humidifier, a supply of liquid water contained in a tank is evaporated into the surrounding air, the liquid water being drawn from the tank and passing through one or more pipes or other conduits and a reservoir prior to evaporation.

The collection system typically includes a collection tray or other collection vessel that captures the condensate in the case of air conditioners and dehumidifiers, and holds the liquid supply in the case of humidifiers. The collection vessel can be in fluid communication with a drain line to allow excess fluid to drain off, e.g., by gravity or with the aid of a pump, and prevent the collection vessel from overflowing. In some examples, the drain line may be part of a plumbing system, such as the plumbing of a building.

The collected liquid can support a proliferation of biological organisms and, over time, biological growth and buildup can occur in the collection vessel and/or in the conduits emanating from the collection vessel. Examples of organisms that commonly grow in air treatment unit condensation collectors and water tanks and conduits include mold and other fungi, such as aspergillus. Aspergillus and other molds can cause an infection in an immune-compromised individual and may be a health hazard. Black mold and legionnaires disease are examples of mold and bacteria that are health hazards. In addition, the buildup can eventually cause a blockage or partial blockage in the collection system, or otherwise interfere with the collection system's ability to drain off excess liquid. If controlled flow out of the collection vessel is sufficiently blocked, the collection vessel can overflow causing flooding. In addition, float switches are often used to shut down the systems when the drain lines are blocked. These switches frequently fail and in many cases the user is not present to detect the shutdown. Lack of cooling and dehumidification in warm climates may lead to appreciable damage from unchecked mold growth on damp surfaces. Flooding of collection chambers can damage the air treatment unit itself, as well as the structure housing the unit, e.g., a home or other building.

The presence of copper ions can inhibit the growth of certain organisms, particularly in an aqueous environment. For example, the exteriors of boat hulls that come in contact with water are sometimes provided with a paint that contains copper. The copper on the surface serves to inhibit the growth of organisms, e.g., snails, mussels, and barnacles, on the hull.

It is also known that adding copper containing salts to air treatment collection vessels will inhibit biological growth. However, it is difficult to monitor the concentration of copper ions in the vessel, which can result in too high or an ineffective concentration of the copper ions.

Other metals and metal salts, such as those derived from zinc, silver, and aluminum, have been reported to have bio-inhibiting properties for molds and certain bacteria. Silver coated catheters are used to reduce infections in medical devices. Mixtures of polymers, carbons and other metal salts as well as biological inhibitors may be used as electrodes or time release biological inhibitors.

There is a need for improvements in systems and methods for reducing biological growth and buildup in the liquid collection vessels and associated components of air treatment systems.

SUMMARY

In general terms, the present disclosure is directed to methods and systems that regulate the growth of biological material in the water collection vessels of air treatment systems. As used herein a "water collection vessel" or "collection vessel" is any vessel of an air treatment system designed to collect or hold water. For example, in the case of air conditioners and dehumidifiers, "collection vessel" can refer to a vessel that captures condensate, while in the case of humidifiers, "collection vessel" can refer to a vessel that holds the liquid supply used to humidify the air. The air treatment systems can be associated with residential or commercial buildings. In certain examples, systems and methods provide one or more features that enable construction of a biological inhibiting system. Monitoring features may, e.g., indicate when the underlying bio-inhibiting system is operational or when maintenance may be required for its continued operation. The bio-inhibiting system can be provided as an integral component built into the air treatment system itself. Alternatively, the bio-inhibiting system can be provided as one or more stand-alone components that can be installed in an existing air treatment system. A feature for monitoring the status of a bio-inhibiting system may be configured as a visible indicator, an audible indicator, or otherwise and, in at least some examples, may be electronically driven and controlled. A change in the operating status of the bio-inhibiting system can manifest as, e.g., the illumination or de-illumination of an indicator light or lights, a change in an illumination pattern or color of an indicator light or lights, the termination or generation of an audible sound (e.g., an alarm, a computer generated visible or audible verbal warning, etc.), the generation of a vibration, etc.

As used herein, terms such as "conductivity," "conductively," and related terms, refer to the movement of ions in aqueous solutions, i.e., ionic conduction/conductivity.

According to certain aspects of the present disclosure, a bio-inhibition system for controlling the buildup of biological material in an air treatment system which includes one or more condensate drain lines includes a current source connected to a pair of spaced apart electrodes, wherein one or more of the electrodes contains a bio-inhibiting ion or chemical inhibitor, and wherein both of the electrodes are positioned to be exposed to liquid present (e.g., condensate in air conditioning and dehumidifying systems, or the water supplied for evaporation in a humidifying system or the drain water output of said systems) in a liquid collection subsystem of the air treatment system. The liquid present acts as an electrolyte that electrically bridges the electrodes to each other, the current source providing the driving force needed to perform migration of ions or chemical inhibitor from the electrodes at a fixed rate, causing the first electrode to release bio-inhibiting ions/chemicals into the liquid. The bio-inhibiting ions then enter the liquid and inhibit the growth of certain organisms within the liquid media.

An electrical current from a current source is connected to the electrodes and the liquid present in the liquid collection subsystem bridges the first and second electrodes as ions begin to enter the liquid. In some examples, either electrode can be connected to the positive or negative side of the current source and the direction of current flow can be reversed periodically to thereby prevent scaling on the electrodes. It should be appreciated, therefore, that in some examples, both of the electrodes may contain a bio-inhibiting material, and the electrode that releases the bio-inhibiting material at any given time depends on the direction of current flow.

Thus, in at least some examples, the bio-inhibiting system of the present disclosure is adapted to inject bio-inhibiting ions and chemicals when the first and second electrodes are at least partially in contact with liquid contained in the liquid collection subsystem and the current source releases ions at a predetermined rate which is proportional to the magnitude of the current.

In some examples, the bio-inhibiting electrode is made of metal or other conductive material metal (e.g., a mixture containing carbon, or a polymer and a metal salt). In some examples, the bio-inhibiting conductor comprises one or more of copper, aluminum, zinc, silver or another electrical conductor such as carbon, or conductive polymer, mixed with a bio-inhibiting material, known now or in the future to have bio-inhibiting properties.

In some examples, the second electrode also includes a metal or other conductive material. Said metal or material may be resistant to dissolution. In some examples, the second electrode may be made of one or more different types of stainless steel.

In some examples, the current source is adapted to provide a current flow through the pair of electrodes such that a concentration in the liquid of ions of the bio-inhibitor (e.g., the concentration of copper ions ($Cu^{++}$)) is in a predetermined range for a given volume of condensate or liquid being treated. In some examples, the predetermined range is from about 50 parts per billion (ppb) to about 2,000 ppb. In some examples, the predetermined range is from about 100 ppb to about 1,000 ppb. In some examples, the predetermined range is from about 200 ppb to about 500 ppb.

In some examples, the current source is adapted to provide current flow between the pair of electrodes which, upon average, is greater in magnitude in one direction. In some examples, the current source is adapted to provide alternating, or pulsatile current flow between the pair of electrodes. In some examples, the current source is adapted to selectively provide both alternating/pulsatile current and an average current between the electrodes that is greater in one direction than in the other direction.

In some examples, the amount of current flowing through the electrodes may be set to a value based upon an estimated volume of condensate or liquid thought to be being produced or present in the collection system. In some examples the quantity of condensate or liquid to be treated may be measured by a volumetric or weight collection device. Examples of such devices include a tilting collection bucket with a counter, or a weighing load cell device under a collection vessel with a solenoid drain valve. By measuring or predicting a quantity of condensate or liquid, control of the concentration of bio-inhibiting material in the aqueous solution can be achieved. Thus, in some examples, a rate of liquid drainage from the collection vessel is used, at least in part, to determine the appropriate amount of current to flow through the electrodes to achieve and maintain a target bio-inhibiting substance concentration in the collected liquid.

In some examples, the concentration of ions in the liquid may be estimated by measuring the conductivity of the liquid between the electrodes prior to applying the current and after the current has been applied along with the time for current flow. This measurement may be performed by measuring the electrical impedance between the electrodes at a frequency of 1 kilohertz (KHZ) or higher. This enables a calculation to be made of the conductivity of the liquid and the approximate concentration of the bio-inhibiting ion prior to current flow and after current is applied for a known duration. Measured impedance between the electrodes can also be used to distinguish between a scenario in which one or both electrodes has failed (in turn, triggering indicia signifying that one or both electrodes need to be replaced or repaired) and a scenario in which the liquid collection vessel is simply dry or no liquid is contacting the electrodes (i.e., no corrective action need be taken), the measured impedance being significantly higher in the latter scenario. Other methods are available for conductivity measurement including non-contact electronic types.

The current level may be then adjusted to maintain a target concentration or target range of concentrations of bio inhibiting ions in the liquid. That is, the current is adjusted and controlled to maintain a constant desired conductivity in the liquid corresponding to a desired concentration of bio-inhibiting ions in the liquid.

In some examples, the concentration of ions in the liquid may be estimated indirectly based on a duration of time that current has been flowing between the electrodes. In at least some of these examples, the liquid is at least relatively stationary, i.e., not flowing out of the collection vessel and thereby draining bio-inhibiting ions from the collection vessel. Because the liquid is at least relatively stationary, the concentration of bio-inhibiting ions in the liquid will increase at a predictable rate over time as current continues to flow between the electrodes. Thus, the current can be adjusted (i.e., lowered and/or switched off) after current has flowed for sufficient time to generate the needed concentration of bio-inhibiting ions in the liquid.

In some examples, an appropriate current is determined based on predicted estimates of condensate production for a given air treatment system. For example, a look-up table that takes into account the type and size of an air treatment system, its geographic location, its altitude, and the season (e.g., relatively dry season versus relatively humid season), etc. can be used by a control system to predict an amount of condensate production at a given time and associate the predicted condensate production with a predetermined fixed current to generate the appropriate amount of bio-inhibitor to maintain the needed concentration of bio-inhibitor in the collected liquid.

In some examples, the current source receives power from a power supply, the power supply being part of, or alternatively external to, the bio-inhibiting system. In some examples the power supply may be a coin battery cell. In some examples, the power supply also provides power to the air treatment system such as the commonly used 24 volt alternating current transformer outputs on many air handlers. In some examples, the current source may be adapted to provide a continuous current flow through the electrodes. In some examples, the current source is adapted to provide a discontinuous (e.g., a pulsing) current through the electrodes, the current fluctuating between zero current and a predefined maximum current value at a predetermined frequency. In some examples, the current source comprises a battery with a current regulating circuit adapted to provide a direct electrical or pulsed current between the pair of electrodes. In some examples, the bio-inhibiting system comprises a current regulator for regulating the output voltage and hence the current provided to the electrodes.

In some examples, an air treatment system comprises an air conditioner, a dehumidifier, or a humidifier, and the liquid collection subsystem of the air treatment system comprises a liquid collection vessel. In some examples, the liquid collection vessel comprises a tray, a pan, a tank, or a reservoir or a tilted weir type collection vessel.

The present disclosure is not limited to air treatment systems that have air conditioning, dehumidifying, or humidifying properties. Rather, principles of the present disclosure may be readily applied to any air treatment system that generates or uses liquid in which biological organisms can grow such as an air washer for humidity control.

In some examples, the liquid collection vessel contains a drainage port positioned in a side wall or a bottom wall of the collection vessel, wherein the pair of electrodes may be positioned at or close to the drainage port.

In some examples, the collection subsystem of the air treatment system comprises a liquid collection vessel and one or more conduits in fluid communication with the collection vessel, wherein the pair of electrodes are adapted to be positioned in the one or more drainage conduits or at ports defining junctions between the one or more conduits and the liquid collection vessel.

In some examples, the bio-inhibiting system comprises an indicator adapted to provide one or more indicia of an operating status of the bio-inhibiting system. In some examples, the one or more indicia are provided via the interface of the bio-inhibiting system or the air treatment system. In some examples, the one or more indicia are visible, audible, or both visible and audible. In some examples, the one or more indicia are wirelessly transmitted to an external receiver such as a Bluetooth enabled smartphone or thermostat. The receiver and/or interface can be a component of a home or building control system, such as an HVAC control system or a broader control system (e.g., that also controls lights, appliances, media equipment, etc.) of a building that provides system outputs and receives system inputs at one or more receivers, e.g., control panels. The components controlled by the control system, including the receivers, can be networked together e.g., via internet of things (IOT) network.

In some examples, the one or more indicia include an audible alarm. In some examples, the one or more indicia include an illumination or de-illumination of a light emitter (e.g., a light emitting diode (LED), an organic light emitting diode (OLED), an incandescent light source, a fluorescent light source, a liquid crystal light source, etc.). In some examples, the one or more indicia include a vibration. In some examples, the one or more indicia include a change in color or a change in illumination pattern of a light emitter. In some examples, the one or more indicia are triggered by a change or discontinuity in the current flow through the pair of electrodes. In some examples, the one or more indicia are triggered by a reduction in a concentration of the bio-inhibiting conductor present in the liquid (e.g., a measured reduction in conductivity of the liquid) collected by the liquid collection subsystem. In some examples, the one or more indicia are triggered by a partial or total disintegration of the bio-inhibiting conductor from the first or second electrode.

In some examples, the bio-inhibiting system includes one or more sensors for sensing a triggering event, the triggering event causing activation of the one or more indicia. In some examples, the one or more sensors includes an ammeter for sensing an electrical current between the first and second electrodes. In some examples, the one or more sensors includes a voltmeter for sensing a voltage across the first and second electrodes. In some examples, the one or more sensors includes a probe adapted to measure a concentration of one or more ions in the collected liquid and/or to measure a conductivity of the liquid. In some examples the system includes a method for measuring the amount of condensate or liquid being treated.

According to further aspects of the present disclosure, a method of inhibiting biological growth in an air treatment system comprises: providing a bio-inhibiting system including a pair of spaced apart electrodes in a liquid collection subsystem of the air treatment system, at least one of the electrodes comprising a bio-inhibiting conductor; positioning the pair of spaced apart electrodes such that the spaced apart electrodes come in contact with liquid collected in the liquid collection subsystem, the collected liquid acting as an electrolyte that electrically bridges the electrodes to each other; and providing a regulated electrical current flow through the electrodes.

In some examples, the method further comprises detecting or otherwise observing an operational change in the bio-inhibiting system; generating one or more indicia indicating the operational change; and, in response to the one or more indicia, replacing the first of the electrodes or replenishing the bio-inhibiting conductor of the first of the electrodes.

The details of one or more embodiments are set forth in the accompanying drawings and the description below. Other features, objects, and advantages of these embodiments will be apparent from the description, drawings, and claims. Moreover, it is to be understood that both the foregoing summary of the disclosure and the following detailed description are exemplary and intended to provide further explanation without limiting the scope of the disclosure as claimed.

DESCRIPTION OF THE DRAWINGS

The following figures, which form a part of this application, are illustrative of described technology and are not meant to limit the scope of the disclosure as claimed in any manner, which scope shall be based on the claims appended hereto.

DETAILED DESCRIPTION

Figure 1:
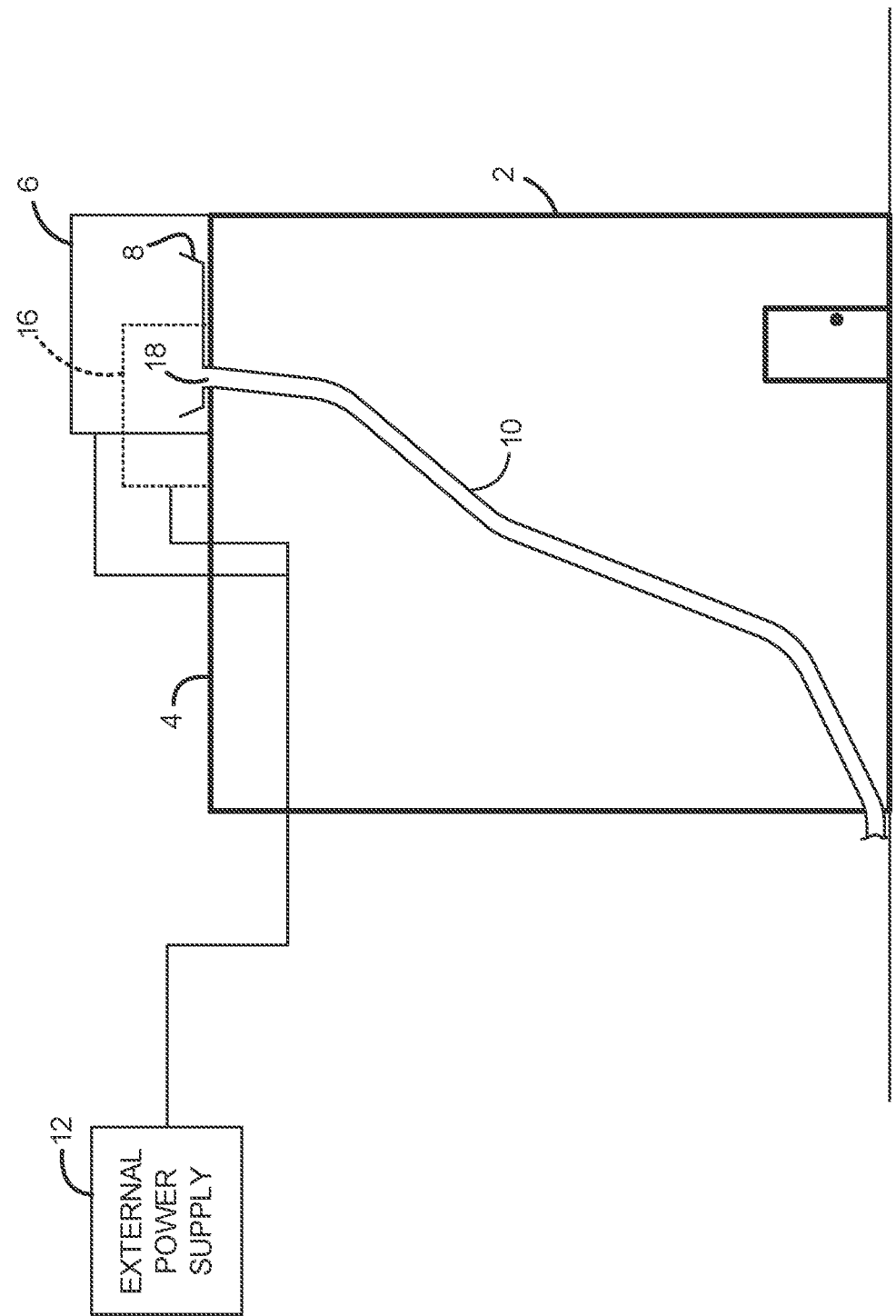
FIG. 1 is a schematic diagram of a building that uses an air treatment system, the air treatment system including a biological growth inhibiting system in accordance with the present disclosure.

Various embodiments of the present inventions will be described in detail with reference to the drawings, wherein like reference numerals represent like parts and assemblies throughout the several views. Reference to various embodiments does not limit the scope of the inventions, which are limited only by the scope of the claims attached hereto. Additionally, any examples set forth in this specification are not intended to be limiting and merely set forth some of the many possible embodiments for the claimed inventions.

Referring to FIG. 1, a building 2 (e.g., a residential building, a commercial building, etc.) has an air treatment system 6 installed at least partially on the roof 4 of the building 2. The air treatment system 6 can be, e.g., an air conditioning system, a humidifying system, a dehumidifying system, a filtration system, an air washer, etc., including combinations thereof. The air treatment system 6 includes a collection vessel 8, e.g., a pan, a tray, a tank, or a reservoir. The collection vessel 8 is positioned to collect liquid used by or generated by the air treatment system 6. For example, the collection vessel 8 collects water condensate generated from an evaporator component of the air treatment system 6, or supplies water to a humidifier. The vessel 8 includes a port 18 for draining liquid out of the building 2 via drainage conduits 10, the conduits 10 being in fluid communication with the collection volume defined by the vessel 8 via the port 18. In this example, the port 18 is positioned in a bottom wall of the vessel 8. However, the port can be positioned in other locations, e.g., in a side wall of the vessel 8.

To provide electrical power to the air treatment system 6, the air treatment system is connected to an electrical current source, e.g., a coin battery cell or an external power supply 12 such as a regional power grid, a generator, etc.

Over time, organisms can grow and proliferate in the water collected in the vessel 8. If the growth is substantial, drainage from the vessel 8 can be slowed or blocked entirely, which can lead to a situation in which the vessel 8 overflows. Mold and bacteria that grow due to the presence of collected water can also present a health hazard. An example organism that tends to thrive and cause clogs in collection vessels and drainage subsystems of air treatment systems is the fungus aspergillus. Should the vessel overflow, detrimental flooding of the building 2 can occur. In addition, in many air treatment systems, when the water level in the collection reservoir rises above a predetermined level the system shuts down and air conditioning or other air treatment ceases.

To mitigate or inhibit the growth of such detrimental organisms, the air treatment system 6 is fitted with a bio-inhibiting system (or bio-inhibition system) 16 in accordance with the present disclosure. The bio-inhibiting system 16 can be a standalone component or module that is installed into an already built air treatment system 6; alternatively, the air treatment system 6 is manufactured with the bio-inhibiting system 16 built into it. The bio-inhibiting system 16 requires electrical power. Power to the bio-inhibiting system 16 can be provided by a power source, e.g., a battery, dedicated to the bio-inhibiting system 16. Alternatively, the bio-inhibiting system 16 can receive power via the air treatment system 6, or directly from an external power supply 12. The power source supplies electrical current to the bio-inhibiting system 16.

Details of various embodiments of the bio-inhibiting system 16 and their interplay with air treatment systems, will now be described in connection with FIGS. 2-5.

Figure 2:
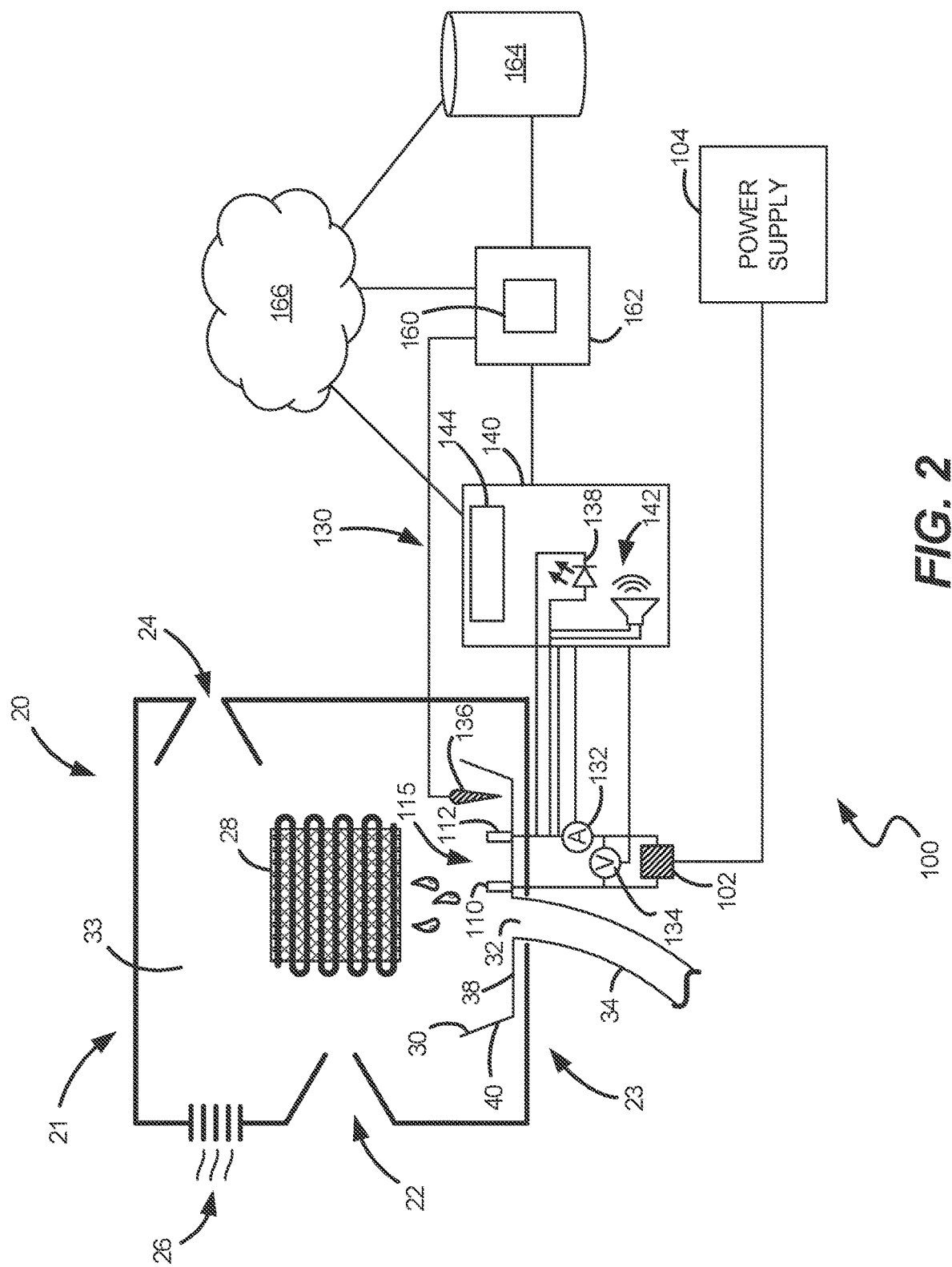
FIG. 2 is a schematic diagram of an example air conditioning system or an example dehumidifier system, including a biological growth inhibiting system in accordance with the present disclosure.

Referring to FIG. 2, an embodiment of an air treatment system 20 is shown. In this example, the air treatment system 20 is an air conditioner or a dehumidifier. The air treatment system 20 has a top 21 and a bottom 23. Moist air is drawn into the chamber 33 via an inlet or intake 22, and passes over an evaporation coil 28. In the case of a dehumidifier, dry air is released through the outlet 24 into the surrounding environment. In the case of an air conditioner, exhaust air is released through the outlet 24, and cool air passes through the vent 26. Condensation from the evaporator coil 28 drips or otherwise falls into the collection vessel 30 by the force of gravity. The collection vessel 30 defines an outlet port 32 through which water drains into a drainage conduit 34.

A bio-inhibiting system 100 is integrated with the air treatment system 20. In some examples, the bio-inhibiting system 100 is built into the air treatment system 20; in other examples the bio-inhibiting system 100 is a standalone component or module that is installed in and/or on the air treatment system 20 after the air treatment system 20 has been manufactured and, in some examples, after the air treatment system 20 has been otherwise fully installed.

The bio-inhibiting system 100 receives electrical current from a dedicated or external power supply 104, i.e., an electrical current source. Electrically connected (e.g., via wires, traces or other conductors) to the current source 104 are two electrodes—an anode 110 and a cathode 112. It should be appreciated that the anode and cathode can functionally switch roles (i.e., such that the electrode 112 functions as an anode and the electrode 110 functions as a cathode) depending on the direction of current flow. For ease of description, the electrode 110 will be primarily referred to as an anode and the electrode 112 will be primarily referred to as a cathode, or both will be referred to generally as electrodes.

The electrodes 110, 112 are positioned within the collection volume defined by the collection vessel 30. In this particular example, electrodes are both positioned slightly above (and spaced apart from) the bottom wall 38 of the vessel 30 and near the port 32. In addition, the two electrodes can be laterally spaced apart from each other at a fixed distance.

One or both of the electrodes 110, 112, include(s) a bio-inhibiting substance, i.e., a bio-inhibiting conductor or chemical (BIC), such as copper, zinc, aluminum, silver, or another conductor or chemical that is known now or in the future to have bio-inhibiting properties and that is released from the electrode by electrolysis. The BIC is in a molecular or elemental form on the electrode(s) that enables the BIC to be released into an electrolyte when an electrical current is made to flow through the electrodes 110, 112. The BIC can be integrated with the electrode or coated on the surface of the electrode. In some examples, one or both of the electrodes 110, 112 includes a conducting material that is resistant to oxidation, e.g., stainless steel, carbon, or another suitable conductor.

In one example, the electrode 110 is copper metal (Cu), and the electrode 112 is stainless steel. When electrical current is caused to flow through the electrodes 110, 112 by the current source 104 in the presence of an electrolyte (e.g., water collected in the vessel 30 that contacts both electrodes 110, 112 forming a conductive bridge therebetween), copper ions ($Cu^{++}$) are released into the electrolyte from the electrode 110 until the copper metal of the electrode 110 is used up. The copper ions present in the electrolyte (i.e., the collected water) inhibit the growth of biological organisms in the vessel 30 and/or the conduit 34.

The magnitude of the current flowing between the electrodes 110, 112 in combination with the amount of liquid in the vessel at a given point in time dictates the concentration of the copper ions that will be present in the electrolyte. For example, a higher current will result in a higher concentration of copper ions for a given volume of collected water. A current regulator 102 is provided to regulate the electrical current between the electrodes 110 and 112. By regulating the electrical current between the electrodes 110, 112, an optimal concentration of bio-inhibitor in the liquid collection subsystem of the air treatment system 20 can be maintained.

Thus, it should be appreciated that the two electrodes 110, 112 are positioned such that an electrolytic cell is generated once water (or another suitable electrolyte) fills the vessel 30 to a level sufficient enough to contact both electrodes 110, 112.

A conductivity meter probe 136, or the electrodes 110, 112 themselves, can be used to measure the electrical conductivity of the electrolyte collected in the vessel. The conductivity of the electrolyte at any given time is an indication of the BIC concentration in the liquid. Thus, the measured conductivity is used to control the current regulator 102 to adjust the electric current to provide a constant or relatively constant (within a fixed range) of BIC concentration in the liquid, even as the volume of collected liquid changes.

For example, the conductivity meter probe 136 or electrodes 110, 112 are used to measure conductivity in the collected liquid before electrical current is supplied to the electrodes 110, 112, providing a baseline conductivity of the liquid. Thereafter, current is supplied to the electrodes 110, 112, and regular conductivity measurements of the electrolyte are taken to maintain the conductivity of the electrolyte at or about a target level or target range of levels above the baseline conductivity, where the difference in conductivity between the baseline and the target corresponds to the concentration of BIC introduced to the electrolyte by the electrolytic cell. With the electrolytic cell operating, if the measured conductivity is higher than the target conductivity, a controller 162 causes the current regulator 102 to reduce the electrical current between the electrodes 110, 112. If the measured operating conductivity is lower than the target conductivity, the controller 162 causes the current regulator 102 to increase the electrical current between the electrodes 110, 112. This control-feedback loop consisting of measuring conductivity in the collected liquid and making corresponding adjustments to the level of electrical current supplied to the electrodes 110, 112 is repeated continuously or at regular intervals (e.g., once per second) to maintain a desired level of BIC concentration in the collected liquid, even as the amount of liquid in the vessel varies and/or the composition of the collected liquid varies.

The bio-inhibiting system 100 includes a status indicator subsystem 130. In general terms, the status indicator subsystem 130 is adapted to provide one or more visible, audible, tactile or other indicia of a stoppage or reduction in electrolysis between the electrodes 110 and 112, indicating that one or both of the electrodes may need or may soon need replenishment or replacement. The indicia can include, e.g., a current reading in the electrolytic cell, a voltage reading in the electrolytic cell, other visible or audible indicia directly tied to the existence, non-existence, or change of current flow between the electrodes 110, 112, or a conductivity measurement in the collected liquid in the vessel 30, or a cumulative measurement of current supplied over time. This can provide a measurement of, for instance, how many grams of the electrodes have been introduced into the liquid and consumed. For example, an ammeter 132 can be used to measure current in the electrolytic cell, and/or a voltmeter 134 can be used to measure voltage across the electrodes 110, 112. A digital clock can be used to measure the accumulated time the current is flowing. A reduction or stoppage in current or voltage that was not initiated by the controller 162 can trigger one or more indicia (e.g., lights, sounds, vibration, text) provided via an input/output (I/O) interface 140. In addition, a measured combination of time and current can predict the end of a useful life of the electrodes. When the measured combination reaches a predetermined threshold, one or more indicia can be triggered that prompt or suggest replacing one or both electrodes. Alternatively or additionally, a measured electrical conductivity of the electrolyte (measured by the probe 136) that is below the target conductivity and does not adequately respond or adjust to control signals provided by the controller 162 to increase the electrical current supplied to the electrodes 110, 112 can trigger the one or more indicia that are provided via the I/O interface 140.

Still referring to FIG. 2, optionally, the I/O interface 140 (such as an I/O interface of a control panel of the air treatment system) includes one or more input devices 144 (e.g., a touch screen, hard or soft keys, etc.) for inputting control commands that control the bio-inhibiting system 100 (e.g., to increase or decrease the electrical current supplied to the electrodes 110, 112, to change a pulsing frequency of the electrical current supplied to the electrodes 110, 112 etc.), and a speaker 142. The control commands can be processed by a processor 160 of the controller 162 (or otherwise operably linked to the controller 162) that generates control signals for controlling the bio-inhibiting system 100. The processor 160 causes the controller 162 to generate the desired control signals by processing input commands via the I/O interface and/or by processing other data provided by components of the bio-inhibiting system 100, such as the conductivity meter probe 136. Optionally, control of the bio-inhibiting system 100 can be provided by connecting one or more of the controller 162, storage device 164, and the I/O interface 140 to a network 166 (e.g., the Internet). Status indicia outputs, and control command inputs, can be handled by an I/O interface 140 that is physically remote from the air treatment system.

The storage device 164 can store computer readable instructions that, when executed by the processor 160, cause the controller 162 to provide control signals to the current regulator 102 to maintain a target conductivity and corresponding BIC concentration in the liquid collected in the vessel. Thus, the computer readable instructions can include preset parameters, such as BIC concentration targets, stored values for condensate production with varying seasons and associated current supplies needed to produce target BIC concentrations, instructions for calculating a BIC concentration based on the difference between measured and baseline conductivities, instructions for associating a needed current supply based on a measured weight or volume of collected liquid, instructions for comparing measured and target conductivities, and instructions for causing the current regulator 110 to increase and decrease electrical current supplied to the electrodes 110, 112 based on differences calculated between measured and target conductivities and/or, in a stationary liquid example, based on a measured time duration of current flow between the electrodes.

Figure 3:
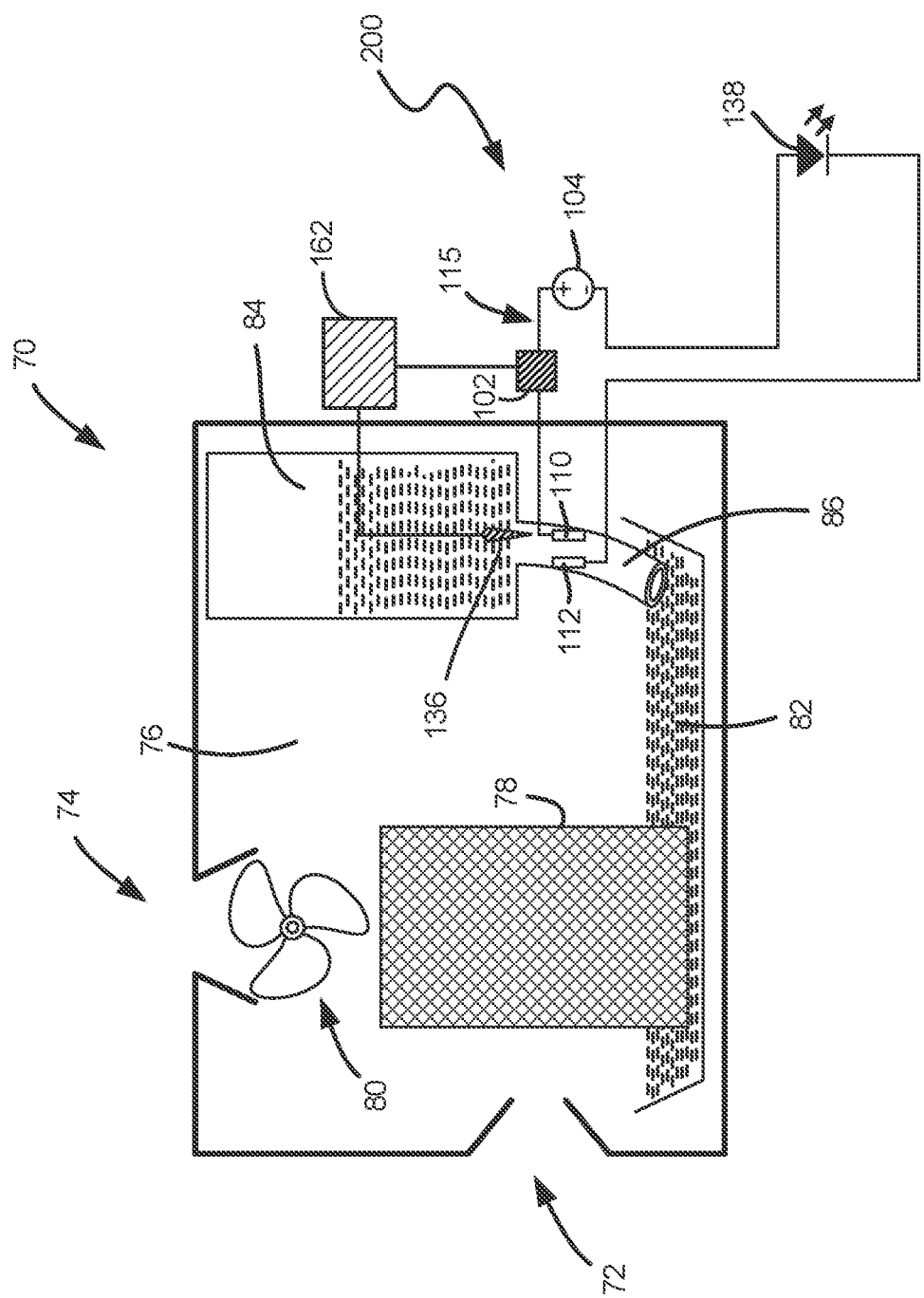
FIG. 3 is a schematic diagram of an example humidifier system, including a biological growth inhibiting system in accordance with the present disclosure.

Referring to FIG. 3, an example humidifier 70 is schematically illustrated. The humidifier defines an internal cavity 76. An inlet or intake 72 takes in dry air from the surrounding environment so that it passes over a moist wick 78. A fan 80 propels the air humidified by the wick 78 through an outlet 74 back into the surrounding environment. The wick 78 is partially submerged in a reservoir 82, thereby keeping the wick moist. The reservoir 82 is supplied with water from a tank 84. The tank feeds into the reservoir 82 via a flow regulating conduit 86.

Over time, and if left unchecked, biological organisms can grow and proliferate in the water contained in the tank 84, the conduit 86, and/or the reservoir 82. If the growth is substantial, a blockage can occur, leading to an overflow event (particularly if there is a constant flow of water into the tank 84). In addition, a blockage can inhibit or prevent the humidifier 70 from being supplied with water it needs to humidify the air, effectively causing the humidifier to fail.

A bio-inhibiting system 200 is installed at the humidifier 70. The bio-inhibiting system 200 functions like the bio-inhibiting system 100 above and includes an electrical current supply 104, spaced apart electrodes 110 and 112, a current regulator 102, a controller 162 for controlling the current regulator 102 and operably connected to a conductivity meter probe 136, and an LED 138 that turns off when the electrolytic cell 115 fails due to a failure of one of the electrodes 110, 112, indicating that maintenance may be required. The electrodes 110, 112 can be placed and mounted where appropriate, e.g., in the tank 84 or in the reservoir 82. In this particular example, the electrodes 110, 112 are mounted within the conduit 86. Generally, whenever there is water in the tank 84, there is water in the conduit 86. If the electrolytic cell 115 is functioning, whenever there is water in the conduit 86 the LED 138 is illuminated due to the electrical current generated by the release of BIC ions into the water from the anode 110.

Figure 4:
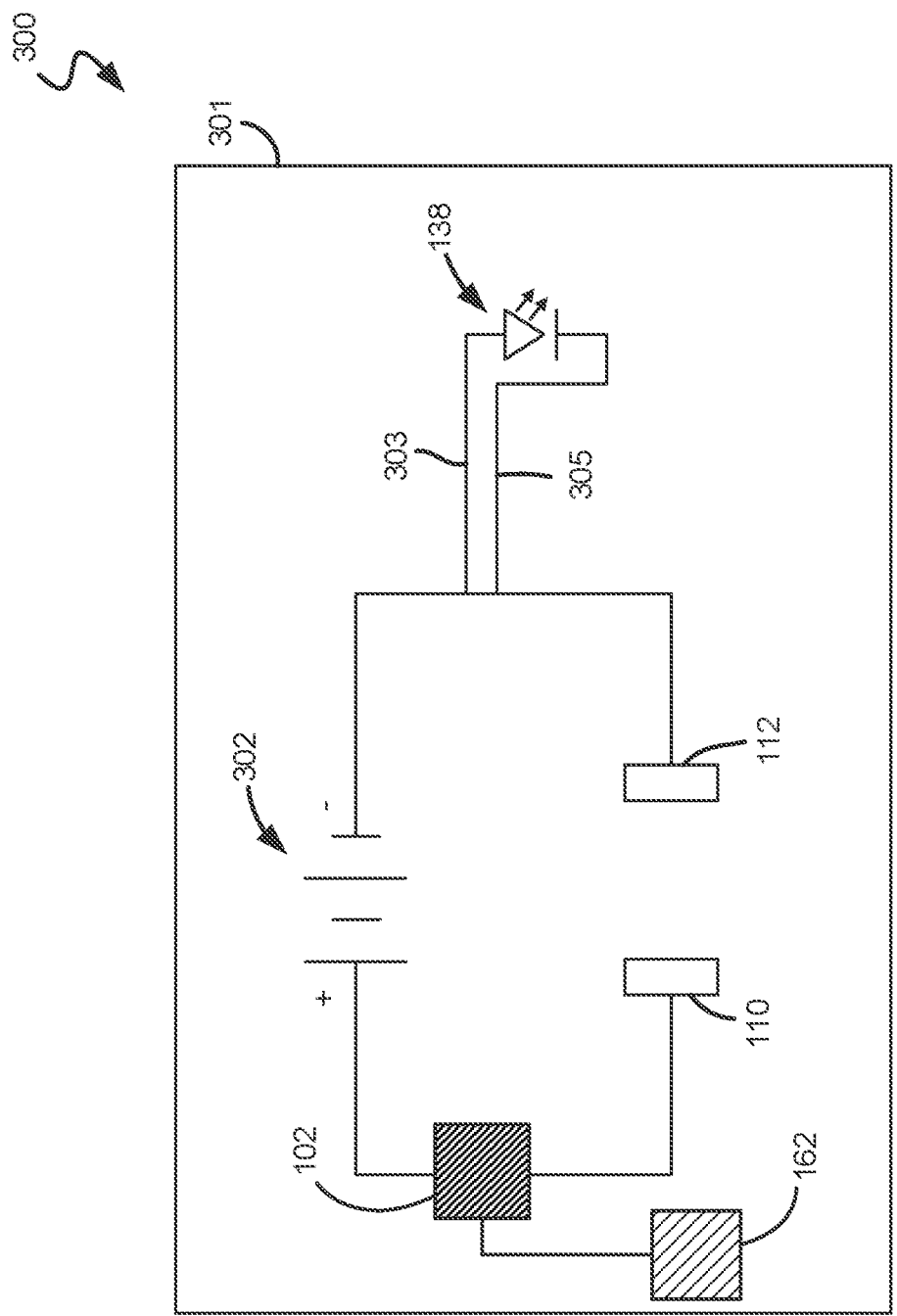
FIG. 4 is a schematic diagram of a standalone biological growth inhibiting system in accordance with the present disclosure, the biological growth bio-inhibiting system being installable in an air treatment system.

FIG. 4 is a schematic diagram of a standalone bio-inhibiting system 300 in accordance with the present disclosure, the bio-inhibiting system 300 being installable in an air treatment system, such as the air treatment systems, 6 (FIG. 1), 20 (FIG. 2), and 70 (FIG. 3) described above.

Optionally, the bio-inhibiting system 300 includes a housing 301 dedicated to housing one or more of the components of the system 300. A battery 302 acts as the current supply to generate a current between the electrodes 110 and 112. Thus, an active electrolytic cell is formed when the electrodes 110 and 112 (as described above) are at least partially in contact with an electrolyte. A current regulator 102 receives control signals from a controller 162 to adjust the current level between the electrodes 110, 112 to maintain a target concentration of BIC in the electrolyte.

While the electrolytic cell is active and before one or both of the electrodes 110, 112 fail, the current in the cell feeds current to an LED 138 that illuminates and/or flashes in one or more colors. For example, the housing 301 can hold the pair of electrodes 110, 112 in such a way that the electrodes are exposed on an exterior surface of the housing 301, the exposure allowing the electrodes to come in contact with water in which the housing is placed. When one or both of the electrodes 110, 112 fail, the LED 138 shuts off, indicating a potential need for maintenance to be performed on the system 300, e.g., to replace or replenish one of the electrodes 110, 112. The hardwiring of the electrolytic cell (e.g., with the conductive wires 303, 305) can be configured such that the LED 138 is placed at some distance from the electrodes 110, 112, e.g., on the outside of the housing 301, on the outside of an air treatment system, or in another room or another building entirely, such as on a remote mobile device or a control panel for an HVAC system. The bio-inhibiting system 300 is adapted to be installed in an already manufactured or already manufactured and fully installed air treatment system.

Figure 5:
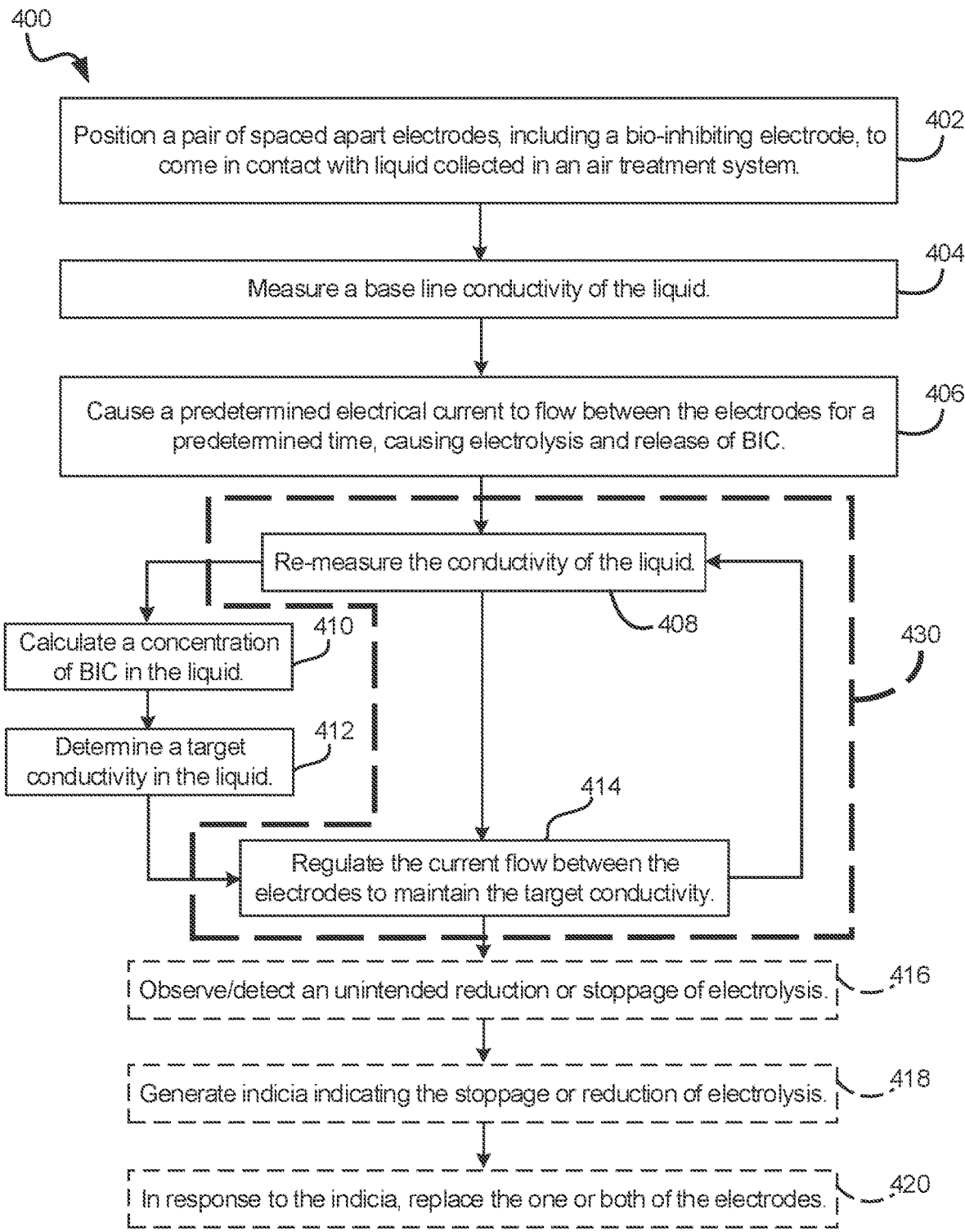
FIG. 5 is a process flow illustrating an example method of inhibiting biological growth in an air treatment system in accordance with the present disclosure.

FIG. 5 is a process flow illustrating an example method 400 of inhibiting biological growth in an air treatment system in accordance with the present disclosure.

In a step 402 of the method 400, a pair of spaced apart electrodes are positioned to come in contact with liquid contained or collected in an air treatment system, e.g., slightly above a bottom surface of a liquid collection vessel of an air treatment system. One or both of the electrodes includes a BIC adapted to be released into the collected liquid during electrolysis.

In a step 404 a baseline conductivity of the collected liquid is measured.

In a step 406, and subsequent to the step 404, a predetermined electrical current is caused to flow between the electrodes for a predetermined time, causing electrolysis to occur and causing the anode to release bio-inhibiting ions into the collected liquid.

In a step 408, and subsequent to the step 406, the conductivity of the liquid in contact with the electrodes is re-measured.

In a step 410, and subsequent to the step 408, a concentration of BIC in the liquid is calculated based on a difference between the measured conductivity at step 408 and the baseline conductivity measured at step 404.

In a step 412, and subsequent to the step 410, a target conductivity in the liquid is determined based on the calculated BIC concentration at step 410.

In a step 414, the current caused to flow between the electrodes is regulated to maintain the target conductivity in the liquid. In some examples, the step 414 includes adjusting over time the amount of electrical current caused to flow between the electrodes to maintain the target conductivity in the liquid. In some examples, the step 414 includes selecting an amount of current caused to flow between the electrodes to maintain the target conductivity in the liquid. The target conductivity corresponds to a predefined target BIC concentration. In some examples, the target conductivity is a range of conductivities and the target BIC concentration is a range of BIC concentrations.

In some examples, steps 406 and 414 are then repeated, optionally multiple times, as a continuous control-feedback loop 430.

In an optional step 416, an unintended reduction or stoppage of electrolysis is detected or otherwise observed, e.g., by a detector or device such as an ammeter, a voltmeter, an ion concentration probe, or another circuit element powered by the electrolysis. In other examples, a predetermined amount of time triggers an indication based on a predetermined prediction that one or both electrodes have been consumed.

In an optional step 418, one or more indicia are generated indicating the unintended stoppage or reduction of electrolysis, or the predicted end of electrode useful life, e.g. a light emitter switches off as a result of current stoppage in the electrolytic cell or as a result of a predetermined time elapsing.

In an optional step 420, remedial action is taken in response to the indicia. For example, one or both of the electrodes are replaced or repaired.

According to a further example method of inhibiting biological growth in an air treatment system in accordance with the present disclosure, a pair of spaced apart electrodes are positioned to come in contact with liquid contained or collected in an air treatment system, e.g., slightly above a bottom surface of a liquid collection vessel of an air treatment system. One or both of the electrodes includes a bio-inhibiting substance adapted to be released into the collected liquid during electrolysis. A fixed or variable amount of current is then caused to flow between the electrodes for a fixed or variable amount of time based on a measured volume or weight of collected liquid or a predicted volume of collected liquid and/or a measured rate of liquid drainage from the air treatment system. The volume or weight of liquid and/or rate of liquid drainage can be measured or predicted continuously, or at preset intervals.

The various examples described above are provided by way of illustration only and should not be construed to limit the scope of the present disclosure. Those skilled in the art will readily recognize various modifications and changes that may be made with respect to the examples illustrated and described herein without departing from the true spirit and scope of the present disclosure.

What is claimed is:

1. An air treatment system, comprising:
a liquid collection system;
a bio-inhibiting system for inhibiting buildup of biological material in the air treatment system, the bio-inhibiting system comprising an electrical current source connected to at least a pair of spaced apart electrodes controlled by a controller, wherein a first electrode of the electrodes comprises a bio-inhibiting conductor, and wherein both of the electrodes are positioned to be exposed to water present in the liquid collection system of the air treatment system, the bio-inhibiting system further comprising an indicator adapted to provide one or more indicia of an operating status of the bio-inhibiting system;
an evaporation coil, wherein the liquid collection system of the air treatment system includes a condensate collection tray positioned beneath the evaporation coil for collecting condensation that drips or otherwise falls from the evaporation coil, wherein the liquid collection system also includes a condensate drain conduit,
wherein the condensate collection tray defines a drainage port positioned in a side wall or a bottom wall of the condensate collection tray for draining water from the condensate collection tray by gravity to the condensate drain conduit, wherein the condensate drain conduit is configured such that the water flows through the condensate drain conduit by gravity, and wherein the pair of electrodes is positioned in the condensate collection tray, or in the drainage conduit; and
wherein the bio-inhibiting system is configured to switch off the bio-inhibiting system when a predetermined concentration of bio-inhibiting ions is reached.

2. The air treatment system of claim 1, further comprising a power supply from which the current source receives power, the power supply being part of, or alternatively external to, the bio-inhibiting system.

3. The air treatment system of claim 2, wherein the power supply is a battery.

4. The air treatment system of claim 2, wherein the power supply also provides power to the air treatment system.

5. The air treatment system of claim 2, wherein the power supply includes a 24 volt alternating current transformer.

6. The air treatment system of claim 1, further comprising a conductivity meter probe positioned adjacent the electrodes.

7. The air treatment system of claim 1, wherein a conductivity meter probe, or the electrodes themselves, are used to measure electrical conductivity of the water.

8. The air treatment system of claim 7, wherein a measured impedance is used to distinguish between a scenario in which one or both electrodes has failed, in turn triggering indicia signifying that one or both electrodes need to be replaced or repaired, and a scenario in which the liquid collection vessel is simply dry or no liquid is contacting the electrodes.

9. The air treatment system of claim 7, wherein an alternating current signal is used to determine the conductivity.

10. The air treatment system of claim 9, wherein the alternating current signal has a frequency of 1 kilohertz or higher.

11. The air treatment system of claim 1, wherein the indicator is adapted to provide the one or more indicia to an external receiver.

12. The air treatment system of claim 11, wherein the indicator is adapted to provide the one or more indicia wirelessly to the receiver.

13. The air treatment system of claim 12, wherein the indicator is configured to interface with a smartphone.

14. The air treatment system of claim 11, wherein the indicator is configured to interface with the internet of things.

15. The air treatment system of claim 11, wherein the external receiver is part of an HVAC control system.

16. The air treatment system of claim 1, wherein the bio-inhibiting conductor comprises copper, zinc, aluminum, silver, or another conductor or chemical having bio-inhibiting properties and that is released from the electrode by electrolysis.

17. The air treatment system of claim 1, wherein the controller is remote from the electrodes and includes a processor for controlling whether or not electrical current is applied between the electrodes.

18. The air treatment system of claim 17, further comprising a sensing probe positioned adjacent the electrodes that interfaces with the controller.

19. The air treatment system of claim 1, wherein the pair of electrodes includes a second electrode including a bio-inhibiting conductor, wherein the electrical current is adapted to flow between the first and second electrodes, wherein either of the first and second electrodes can be connected to a positive side and a negative side of the current source, and wherein the air treatment system is configured to periodically reverse a direction of electrical current flow between the first and second electrodes.

20. The air treatment system of claim 1, wherein the pair of electrodes are both positioned above the bottom wall of the condensate collection tray.

21. The air treatment system of claim 1, wherein the pair of electrodes are both positioned within the drain conduit.

22. The air treatment system of claim 1, wherein the bio-inhibiting system is configured to release bio-inhibiting ions into the water via the bio-inhibiting conductor and is configured to estimate a concentration of the bio-inhibiting ions in the water based on an electrical conductivity between the electrodes.

23. The air treatment system of claim 22, wherein the bio-inhibiting system is configured to control operation of the bio-inhibiting system based on the estimated concentration of bio-inhibiting ions.

24. The air treatment system of claim 1, wherein the bio-inhibiting system is configured to release bio-inhibiting ions into the water via the bio-inhibiting conductor and is configured to measure an electrical impedance between the electrodes.

25. The air treatment system of claim 24, wherein the bio-inhibiting system is configured to estimate a concentration of the bio-inhibiting ions in the water based on the electrical impedance.

26. The air treatment system of claim 1, wherein electrical conductivity is used to identify a scenario in which one or both electrodes has failed.

27. The air treatment system of claim 26, wherein the electrical conductivity is between the electrodes.

28. The air treatment system of claim 27, wherein the electrical conductivity is based on a measured impedance between the electrodes.

29. The air treatment system of claim 1, wherein electrical conductivity is used to identify a scenario in which the condensate collection tray is simply dry or no liquid is contacting the electrodes.

30. The air treatment system of claim 29, wherein the electrical conductivity is between the electrodes.

31. The air treatment system of claim 30, wherein the electrical conductivity is based on a measured impedance between the electrodes.

32. The air treatment system of claim 1, wherein the bio-inhibiting system is powered even when air is not moving through the air treatment system.

33. An air treatment system, comprising:
a liquid collection system;
a bio-inhibiting system for inhibiting buildup of biological material in the air treatment system, the bio-inhibiting system comprising an electrical current source connected to a pair of spaced apart electrodes controlled by a controller, wherein a first of the electrodes comprises a bio-inhibiting conductor, and wherein both of the electrodes are positioned to be exposed to water present in the liquid collection system of the air treatment system, the bio-inhibiting system further comprising an indicator adapted to provide one or more indicia of an operating status of the bio-inhibiting system; and
an evaporation coil, wherein the liquid collection system of the air treatment system includes a condensate collection tray positioned beneath the evaporation coil for collecting condensation that drips or otherwise falls from the evaporation coil, wherein the liquid collection system also includes a condensate drain conduit,
wherein the condensate collection tray defines a drainage port positioned in a side wall or a bottom wall of the condensate collection tray for draining water from the condensate collection tray by gravity to the condensate drain conduit, wherein the condensate drain conduit is configured such that the water flows through the condensate drain conduit by gravity, and wherein the pair of electrodes is positioned in the condensate collection tray, or in the drainage conduit;
wherein the controller is configured to identify, based on a first electrical conductivity, that at least one of the pair of spaced apart electrodes has failed and to cause electrode failure indicia to be generated by the indicator signifying that one or both of the pair of spaced apart electrodes has failed; and
wherein the controller is configured to identify, based on a second electrical conductivity, that the condensate collection tray is simply dry or no liquid is contacting the electrodes and to not cause the electrode failure indicia to be generated by the indicator.

34. The air treatment system of claim 33, wherein the first electrical conductivity and the second electrical conductivity are based on measured impedances between the electrodes.

35. The air treatment system of claim 33, wherein an alternating electrical current supplied to the electrodes is used to measure the first electrical conductivity and the second electrical conductivity.

36. An air treatment system, comprising:
a liquid collection system;
a bio-inhibiting system for inhibiting buildup of biological material in the air treatment system, the bio-inhibiting system comprising an electrical current source connected to a pair of spaced apart electrodes controlled by a controller, wherein a first of the electrodes comprises a bio-inhibiting conductor, and wherein both of the electrodes are positioned to be exposed to water present in the liquid collection system of the air treatment system, the bio-inhibiting system further comprising an indicator adapted to provide one or more indicia of an operating status of the bio-inhibiting system; and
an evaporation coil, wherein the liquid collection system of the air treatment system includes a condensate collection tray positioned beneath the evaporation coil for collecting condensation that drips or otherwise falls from the evaporation coil, wherein the liquid collection system also includes a condensate drain conduit,
wherein the condensate collection tray defines a drainage port positioned in a side wall or a bottom wall of the condensate collection tray for draining water from the condensate collection tray by gravity to the condensate drain conduit, wherein the condensate drain conduit is configured such that the water flows through the condensate drain conduit by gravity, and wherein the pair of electrodes is positioned in the condensate collection tray, or in the drainage conduit; and
wherein the bio-inhibiting system is configured to determine that one or both of the electrodes has failed based on an electrical conductivity between the electrodes.

37. The air treatment system of claim 36, wherein the bio-inhibiting system is configured to determine that the condensate collection tray is simply dry or no liquid is contacting the electrodes based on the electrical conductivity between the electrodes.

38. The air treatment system of claim 36, wherein the electrical conductivity is based on a measured impedance between the electrodes.

39. The air treatment system of claim 36, wherein an alternating electrical current supplied to the electrodes is used to measure the electrical conductivity between the electrodes.

* * * * *